Jan. 25, 1949.   K. B. BRITTON   2,460,165
MEANS FOR INDICATING ICE ON AIRCRAFT SURFACES
Filed Jan. 10, 1946
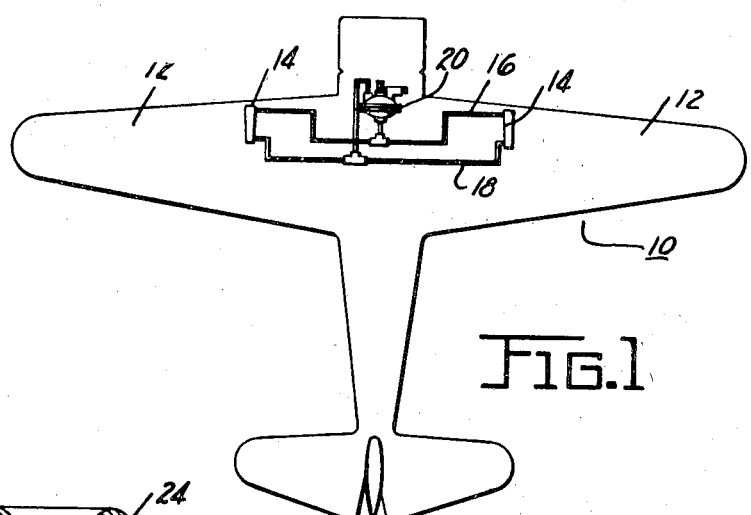
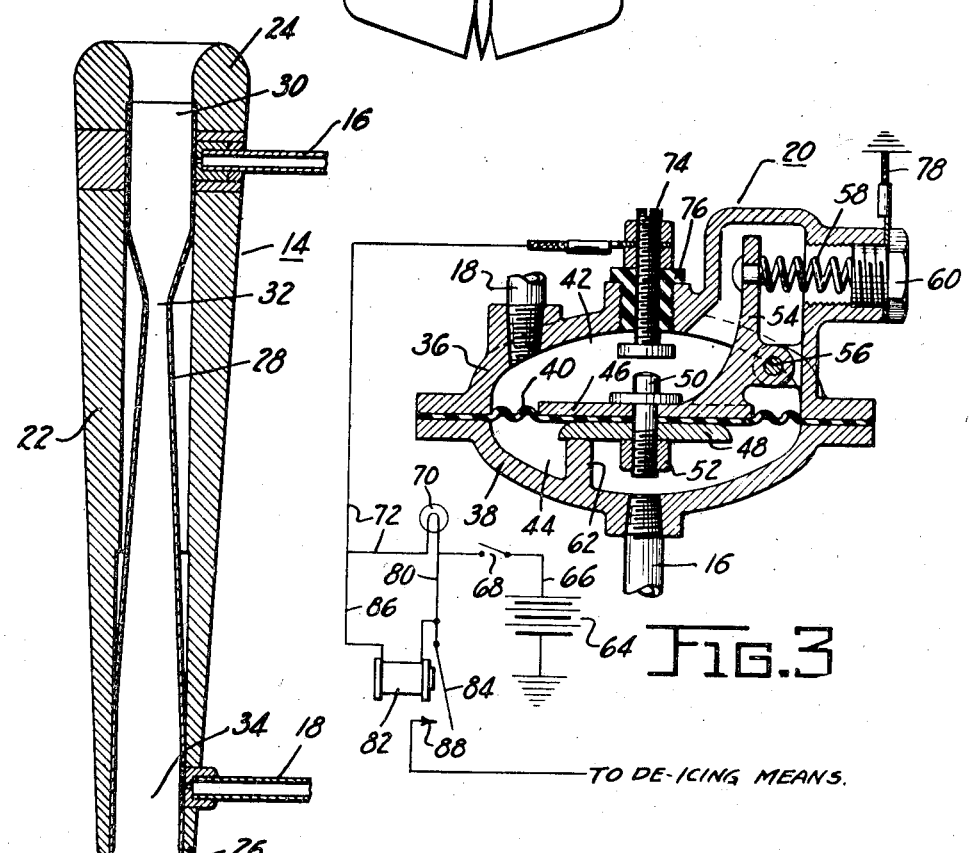
INVENTOR
KARL B. BRITTON
BY Cecil J Arens
ATTORNEY Patented Jan. 25, 1949

2,460,165

UNITED STATES PATENT OFFICE 2,460,165

MEANS FOR INDICATING ICE ON AIRCRAFT SURFACES

Karl B. Britton, Cleveland, Ohio, assignor to Bendix Aviation Corporation, South Bend, Ind., a corporation of Delaware Application January 10, 1946, Serial No. 640,223

4 Claims. (Cl. 177—311)

This invention relates generally to improvements in devices for indicating the formation of ice on airfoils, and particularly to devices of this type which are adaptable for use with aircraft.

As is known to those in the aircraft art, the formation of ice on the surfaces of an aircraft is accomplished with great rapidity, and oftentimes the accumulation of ice has become so great before its presence is known by the pilot that the aircraft is likely to become unmanageable with the possible consequent destruction thereof. The rapid formation of ice on the aircraft surfaces sometimes makes it impossible for the pilot to proceed to some other altitude where the ice will not form, or to some warmer altitude where it will disappear. Accordingly, as a safety measure it is very desirable for the pilot to become immediately apprised of the formation of ice on the aircraft surfaces, or to be apprised of the possibility of the rapid accumulation of ice on said surfaces.

With the foregoing problems in mind it is an object of this invention to provide an extremely sensitive device for indicating the formation of ice on aircraft surfaces, or indicating the imminence of formation of ice.

Yet another object is to provide a device of novel construction which will immediately indicate the formation of ice, so that deicing means may be immediately set into operation to remove the ice.

A still further object is to provide a visual indication to the pilot of the formation of ice on the aircraft, so that the pilot can proceed to another altitude and thus avoid the further formation of ice upon the aircraft surfaces.

Other objects and advantages of the invention will be apparent from a study of the description hereinafter. It is to be distinctly understood, however, that the invention is not limited by the terms of the description of the embodiment shown, nor otherwise than by the terms of the claims which are appended hereto. In the drawings which illustrate a preferred embodiment of the invention:

Figure 1 is a diagrammatic outline of an aircraft having the invention embodied therein;

Figure 2 is a section taken through a pressure sensitive device shown in Figure 1; and Figure 3 is a section taken through a pressure responsive device shown in Figure 1 and showing also the details of an electric circuit energized by the operation of the pressure responsive device shown in Figure 3.

Referring now to Figure 1, there is shown an airplane, indicated generally by the ordinal 10, having a plurality of wings 12 on which are mounted one or a plurality of flow sensitive devices 14, which are connected by conduits 16 and 18 to a pressure responsive device indicated generally by the ordinal 20. The disposition of the flow sensitive device 14 is such that the slip stream of the aircraft 10 moves past the device at all times the aircraft 10 is in flight.

Referring now to Figure 2, the flow sensitive device 14 comprises a tube 22 having a smooth taper from its forward portion to its rearmost portion both internally and externally. The tube 22 may have a rounded or faired nose or entrance portion 24 and a similarly faired or rounded trailing portion 26 to prevent unnecessary turbulence of the air passing through and around the device. The interior of the tube 22 is provided with a venturi 28 as shown which has an entrance portion 30, a throat portion 32 and an exit or trailing portion 34. The dimensions of the trailing portion 34 are such that full recovery in pressure is obtained at the exit portion 34, i. e., the pressure at the entrance portion 30 will be the same at the exit portion 34, as long as the constriction is held within predetermined limits. As shown in Figure 2, conduit 16 is connected to the flow sensitive device 14 at the entrance portion 30, and conduit 18 is connected to the flow sensitive device at the exit portion 34, whereby the pressure values existing at the entrance portion 30 and the exit portion 34 will be transmitted within said conduits 16 and 18. It may be noted that an annular space is maintained between the throat 32 and the tube 22, so that the refrigerating effect in the throat 32 is required to cool the venturi 28 only.

The pressure responsive device 20 is connected to the flow sensitive device 14 by conduits 16 and 18 which connect the entrance portion 30 and the exit portion 34 respectively, of the latter device. The pressure responsive device 20 is formed of two body members 36 and 38 which are separated by a diaphragm 40 thus forming a chamber 42 which is connected by the conduit 18 to the exit portion 34 of the flow sensitive device 14 shown in Figure 2, and a second chamber 44 which is connected by the conduit 16 to the entrance portion 30 of the flow sensitive device 14. The diaphragm is held between a pair of platelike members 46 and 48, by means of the capscrew 50 and a nut 52. The element 46 has an arm 54 projecting therefrom which is pivoted at 56 to the body member 36, and is spring-biased in a downward direction by means of a spring 58 secured to the free end of the arm 54 and held in the body member 36 by means of the cap-screw 60. The downward movement of the element 46, and of the diaphragm 40 and the plate 48 is limited by a projection 62 formed integrally with the body member 36.

As shown in Figure 3, means are provided for indicating to the pilot the formation of ice on the aircraft wing surface 12, and for setting into operation any convenient deicing means which might be employed. As shown in Figure 3, a source of power 64 is provided which is connected through a lead 66, through power switch 68, and thence through a signal lamp 70 to a lead 72, which is connected to a post 74 secured in the body member 36 and insulated therefrom by an insulating member 76. The post 74 is threaded whereby its position may be adjusted with respect to the body member 36. The body member 36 is grounded at the cap-screw 60 by means of a lead 78 connected thereto. Branching from lead 72 is another lead 80 which is connected to a relay 82 and an armature 84 thereof, and thence to a lead 86, which in turn is connected to the lead 72. Armature 84 is adapted at times to close at contact point 88 whereby current will be supplied to any convenient deicing means.

The operation of the device described above is as follows:

Assuming that the aircraft 10 is first flying at a level where icing does not take place, the pressure in conduit 16 will be the same as the pressure in conduit 18, and the position of the diaphragm 40 will be that shown in Figure 3, since the pressures on each side of the diaphragm are equal, and since the very light load in spring 58 will tend to force the diaphragm 40 and the plate 48 downwardly against the stop 62. When the meteorological conditions ambient the aircraft becomes favorable to the formation of ice on the aircraft surfaces, ice is first formed in the throat of the venturi, and subsequently on the aircraft surfaces. The reason being that the venturi produces a refrigerating effect which tends to cause deposition of ice in the Venturi throat before its formation on the wings 12. This formation of ice in the Venturi throat upsets the normal pressure relationship in conduits 16 and 18 to thereby create a pressure differential between chambers 42 and 44. It will be seen that the pressure in conduit 16 and in the chamber 44 will be greater than the pressure in conduit 18 and in the chamber 42, since the constriction in the throat 32 will not permit the full recovery of the pressure in the exit portion 34, and since a suction pressure will be transmitted to the exit portion 34 by the movement of the aircraft 10 through the air. The pressure differential thus created by the chamber 44 and the chamber 42 cause the diaphragm 40 to be moved upwardly, and the plate 46 to pivot at 56 and the spring 58 to be compressed. It will be seen, then, that the upward movement of the diaphragm 40 and the plate-like element 46 will cause contact between cap-screw 50 and the post 74. With the switch 68 closed, current begins to flow immediately through the lamp 70, thereby indicating to the pilot the formation of ice, and through the lead 80 to energize the relay 82. Energization of the relay 82 attracts the armature 84 to the left thereby supplying current to the deicing means which will then be connected through the source of power at the contact point 88.

While the invention has been described above with reference to a preferred embodiment, it is to be distinctly understood that the invention is not limited by the terms of the embodiment shown nor otherwise by the terms of the claims hereto appended.

I claim:

1. Apparatus of the class described for indicating the formation of ice on aircraft surfaces comprising means for measuring pressure at a plurality of points, said means including an entrance portion having a pressure receiving conduit connected thereto, an exit portion having a second pressure receiving conduit connected thereto, a throat portion intermediate said entrance portion and said exit portion, said throat portion so constructed and arranged with respect to the entrance and exit portions that the pressures created in said entrance and exit portions, respectively, are normally the same but subject to variation when the area of the throat portion is varied due to accumulation of ice therein means connected to the conduits and responsive to a differential in pressure between said entrance and exit portions, and a circuit energized by operation of the last said means.

2. Apparatus of the class described for indicating the formation of ice on aircraft surfaces comprising means for measuring pressure at a plurality of points, said means including an entrance portion having a pressure receiving conduit connected thereto, an exit portion having a second pressure receiving conduit connected thereto, a throat portion intermediate said entrance portion and said exit portion, said throat portion so constructed and arranged with respect to the entrance and exit portions that the pressures created in said entrance and exit portions, respectively, are normally the same, means responsive to a differential in pressure between said entrance and exit portions when said throat portion is constricted by ice, said last named means comprising a pair of chambers one of which is connected to one of said pressure receiving conduits and the other of which is connected to the other of said pressure receiving conduits, a diaphragm interposed between the chambers and forming a wall common to each chamber and movable in response to said differential in pressure in said chambers, and a circuit constituted to be energized by movement of the diaphragm.

3. Apparatus of the class described operable by the formation of ice on aircraft surfaces comprising a venturi having an entrance portion, a throat portion, and an exit portion, said exit portion being so proportioned as to normally acquire complete recovery therein of the pressure existing in said entrance portion, means responsive to a pressure differential between said entrance portion and said exit portion when ice is formed in said throat portion, said last named means comprising a pair of chambers, a diaphragm interposed between the chambers and forming a wall common to both of said chambers, a conduit connecting the entrance portion to one of said chambers, a second conduit connecting the exit portion to the other of said chambers, and an electric circuit constituted to be energized by movement of the diaphragm.

4. An ice anticipator for aircraft comprising a venturi having its throat located in the airstream, said throat constituted so that the pressures created on either side thereof are normally the same but subject to variation when the area of the throat portion is varied, means responsive to differential pressure, means connecting opposite sides of said Venturi throat to said first-named means, said venturi being constructed and arranged to form ice in the throat thereof to thereby restrict the flow therethrough when the meteorological conditions ambient the aircraft are conducive to formation of ice on the aircraft surfaces, whereby a differential pressure is created within the first-named means to actuate the same, and means controlled by the first-named means for indicating said ambient conditions.

KARL B. BRITTON.

REFERENCES CITED

The following references are of record in the file of this patent:

UNITED STATES PATENTS

| Number | Name | Date |
|---|---|---|
| 2,269,019 | Hall | Jan. 6, 1942 |
| 2,338,574 | Cunningham | Jan. 4, 1944 |

FOREIGN PATENTS

| Number | Country | Date |
|---|---|---|
| 213,362 | Switzerland | May 1, 1941 |
| 622,993 | Germany | Aug. 3, 1934 |